United States Patent [19]

Sargisson

[11] 4,147,029
[45] Apr. 3, 1979

[54] LONG DUCT MIXED FLOW GAS TURBINE ENGINE

[75] Inventor: Donald F. Sargisson, Cincinnati, Ohio

[73] Assignee: General Electric Company, Lynn, Mass.

[21] Appl. No.: 731,664

[22] Filed: Oct. 13, 1976

Related U.S. Application Data

[62] Division of Ser. No. 646,326, Jan. 2, 1976.

[51] Int. Cl.² .................................................. F02K 3/06
[52] U.S. Cl. .................................... 60/262; 60/226 A; 60/39.31; 244/54; 137/15.1
[58] Field of Search .................. 60/226 R, 262, 39.31; 137/15.1; 244/54

[56] References Cited

U.S. PATENT DOCUMENTS

| | | | |
|---|---|---|---|
| 3,618,699 | 11/1971 | Evans | 137/15.1 |
| 3,675,418 | 7/1972 | Heinz et al. | 60/39.31 |
| 3,861,140 | 1/1975 | Krabacher | 60/262 |
| 4,013,246 | 3/1977 | Nightingale | 244/54 |
| 4,022,018 | 5/1977 | Tuten et al. | 60/39.31 |

Primary Examiner—Robert E. Garrett
Attorney, Agent, or Firm—Henry J. Policinski; Derek P. Lawrence

[57] ABSTRACT

A gas turbine engine is provided with a long nacelle which forms both the inlet and exhaust of the engine. The nacelle is spaced apart from a core engine to define an annular bypass duct therebetween. The incoming air stream is pressurized by a front fan disposed in the inlet and then divided between the core engine and bypass duct. A lobed mixer device is provided downstream of the core engine to intermix the core engine and bypass duct exhaust streams. The mixed streams are discharged from a common nozzle formed at the downstream end of the nacelle. A non-redundant system of mounts are provided to secure the engine to the pylon of an aircraft in such a manner as to reduce engine thrust induced bending loads and insure symmetry of these thrust loads. The total reaction of the thrust loads at the mounting points is reduced by a unique interlocking system by which all of the major engine assemblies are joined. The engine is configured such that it may be easily removed from an aircraft and replaced with a spare engine in minimum time. This quick change capability is achieved by mounting the engine such that it may be removed from the aircraft by disconnecting the forward and rear mounts and an engine bleed duct. The mid portion of the engine nacelle and all accessories mounted thereon remain with the aircraft.

3 Claims, 25 Drawing Figures

LONG DUCT MIXED FLOW GAS TURBINE ENGINE

This is a division of application Ser. No. 646,326, filed Jan. 2, 1976.

CROSS REFERENCE TO RELATED APPLICATIONS

This application is being filed concurrently with U.S. applications, Ser. Nos. 646,073, 646,074 (now U.S. Pat. No. 4,030,291), 646,075 (now U.S. Pat. No. 4,075,833), and 646,325, each filed on Jan. 2, 1976 each assigned to the assignee of the present invention and each disclosing a species of the generic invention disclosed and claimed herein.

BACKGROUND OF THE INVENTION

The present invention relates to improvements in gas turbine engines and nacelles therefor and, more particularly, to a novel gas turbofan engine and nacelles therefor which exhibits lower noise levels, improved fuel consumption, greater reliability, easier maintainability, easier replaceability, and improved thrust reversal over prior art gas turbofan engines.

Considerable attention has been devoted to developing a gas turbine engine and a nacelle therefor which is quiet, clean and economical to operate. Significant improvement has been made in fuel consumption and noise levels of gas turbine engines over the past decade. Accordingly, a new family of high bypass, large diameter turbofans have recently been introduced into service. These engines have demonstrated noise levels and fuel consumption characteristics far superior to prior art gas turbine engines. The reduced noise levels of such high bypass turbofan engines is attributable to the reduced exit velocities of airflow pressurized by the fans. Though far more quiet than prior art gas turbofan engines, the recently introduced high bypass turbofan engines have higher noise levels than are desired. Thus, government regulatory agencies are applying even more stringent requirements on newly certificated commercial aircraft. The objectionable noise levels in such engines generally result from the high tip speeds of the large diameter fan blades required to efficiently pessurize the bypass duct flow. This is in contrast to the turbojet or low bypass ratio turbofan engines in which the dominant noise source results from the discharge of the hot core gas stream through its propulsive nozzle.

Another ecological problem associated with prior art gas turbine engines is that of fluid drainage. Thus, many prior art engines include fluid distribution systems in which excess fluid is not collected by any means provided by the engine and which therefore may be drained overboard onto airport runways when the engine is shut down.

While the current high bypass turbofan engines exhibit significantly lower specific fuel consumption levels than earlier engines, further improvements in specific fuel consumption are desired for both economic and fuel conservation reasons.

Another area in which improvement in the performance of prior art high bypass turbofan engines is desired is in the area of thrust reversal. One of the operational requirements of aircraft gas turbine engines is that of quick reversal from forward to reverse thrust for braking purposes after landing. Accordingly, such engines have included various schemes for reversing the forward thrust delivered by the engine. In conventional high bypass engines, this has generally been accomplished by the use of blocker doors and other apparatus for reversing the exhaust direction of the bypass stream. In addition to reversing the bypass stream exhaust direction, such engines have also has to employ mechanisms for reducing the forward thrust of the core engine. Accordingly, they have included core engine exhaust flow thrust spoilers on thrust reversers in addition to the bypass stream reversers.

Another source of problem in the design of gas turbofan engines is the means by which they are mounted to the aircraft. Prior art engines have in most instances been mounted in their installations so that the normal engine thrust loads induce some bending forces in the engine casings, giving rise to mechanical rubbing of rotating parts on stationary surfaces with subsequent reduction in performance and high repair costs.

It is therefore a primary object of the present invention to provide a economical, easily maintained gas turbofan engine with improved noise levels, fuel consumption, thrust reversal, replaceability, ecology, and mounting means.

SUMMARY OF THE INVENTION

This and other objects are achieved in the preferred embodiment of this invention in which a gas turbofan engine is provided with an outer nacelle which forms both the engine inlet and exhaust. The nacelle is spaced apart from a core engine to define an annular bypass duct therebetween. The incoming air stream is pressurized by a fan disposed in the inlet and thereafter divided between the core engine and bypass duct. A low pressure turbine is provided downstream of the core engine to supply rotational energy to the fan. A convoluted lobed mixer having a plurality of circumferentially spaced alternating cold chutes in flow communication with the bypass duct and hot chutes in flow communication with the core engine is provided downstream of the low pressure turbine to intermix the core engine and bypass duct exhaust streams. The mixed stream is thereafter discharged from a fixed area nozzle formed integral with the outer nacelle.

It has been demonstrated that the propulsive force provided by the discharge of the intermixed streams is significantly greater than is obtainable by exhausting each stream through a separate nozzle system. This phenomenon is a direct result of the more efficient utilization of the thermal energy of the core exhaust stream. In separated flow engines, much of the thermal energy of the core exhaust stream is lost when it is directly discharged into the ambient atmosphere. However, the engine of the present invention, by intermixing the core engine and bypass streams so as to increase the temperature of the bypass stream, while decreasing the temperature of the core stream, permits the thermal energy of the core stream to be more efficiently utilized to produce a greater thrust from the combined exhaust than is obtainable by separately exhausting the core and bypass streams.

It has also been determined that the thrust delivered from the long duct mixed flow exhaust system of the present invention, at cruise speed and altitudes, is also significantly greater than that available from a short duct mixed flow engine. This increased thrust is the combined result of the more efficient propulsive force described above and the elimination of the scrubbing drag which accompanies the bypass duct fan exit flow, discharged at supersonic velocity, over the core engine nacelle surfaces downstream of the short bypass duct exhaust nozzle. Other aerodynamic factors also support the fact that the long duct mixed flow system has increased thrust capability over separated flow systems due to reduced installed aerodynamic drag.

The engine of this invention is provided with a variable geometry mechanism for controlling the cross-sectional flow area of the inlet throat. The variable geometry mechanism may be configured to maintain the throat velocity of the inlet airflow at a sufficiently high level during aircraft takeoff and climbout such that forward propagation of inlet noise is significantly reduced.

The engine of this invention is integrated into the nacelle in the general manner as described in U.S. patent application, Ser. No. 522,108 filed by A. P. Adamson, et al on Nov. 8, 1974.

A thrust reverser system is provided upstream of the core engine and downstream of the fan. The thrust reverser system reverses the discharge direction of the airflow exhausted from the bypass duct in order to reduce the forward thrust of the engine. An additional reverse thrust bonus is provided by the engine due to the creation of reduced pressure relative to ambient at the mixer exhaust when the bypass flow is reversed and, because upon reversal of the bypass flow the hot gas stream becomes over-expanded, thereby losing a very substantial portion of its propulsive effectiveness as it is discharged through the common exhaust nozzle, which has an area at these flow conditions far in excess of that which would be used for an efficient propelling nozzle. Because of the additional reverse thrust bonuses, increased reverse thrust can be achieved in the engine of this invention without the use of core engine thrust reversers or spoilers. The unique design and location of the thrust reverser permits the engine of the present invention to utilize an aerodynamically efficient and relatively easy to manufacture cylindrical structure immediately aft of the engine fan frame. Normally, a cylindrical structure cannot be incorporated in this part of the engine. The difficulty in satisfying all of the mechanical and aerodynamic requirements for the incorporation of a bypass stream thrust reversing system generally requires a conical or other non-parallel or axially curved structure.

The engine of this invention has significantly reduced noise levels. The mixing of the core and bypass stream produces a reduced core engine gas stream exhaust velocity and therefore noise at all engine operating conditions. In order to further reduce noise, the nacelle is constructed of a thin wall honeycombed acoustically absorbent structure which greatly reduces engine noise levels throughout its entire length. Core engine noise is reduced by acoustical treatment within the mixer. Thus, the mixer may include various combinations of acoustically treated lobes, spool pieces, radial splitters, and/or circumferential splitters. Turbine noise is further reduced by acoustically treating the central core, or exhaust plug of the mixer assembly.

The engine of this invention is easily maintained. Thus, all of the engine accessories, including those that are mechanically driven by the engine, with the exception of an oil pressure and scavenge pump unit, are located outside the nacelle in the general area of the forward leading edge of the pylon of aircraft to which the engine is mounted. This location permits these components to be easily serviced or replaced without removing or opening the engine.

The engine of this invention is also clean. Thus, the engine is provided with an ecology drain tank and plumbing system that serves to conduct all engine drain fluids away from the nacelle to a discharge point located in a region of airflow that is exterior to the nacelle, and further permits easy detection of the source of excess fluid leakage within the engine.

Also included in the overall engine design are novel provisions for the mounting of the nacelle to the aircraft pylon structure. A system of forward mounts and a system of rear mounts which act in combination in a non-redundant manner are utilized for this purpose. The thrust links are attached to the pylon by way of a single point hinge link and are geometrically designed so that the engine bending loads are reduced, and the thrust loads are automatically mechanically balanced by the load sharing of the mounting system.

A further feature of the turbofan engine of this invention is that the nacelle is separable into inlet, mid and exhaust nozzle portions which are mechanically locked to each other by joints designed to react axial loads in either the forward or aft thrust directions. These provisions assure that the thrust loads as seen by the engine at the provided reaction points are held to minimum values consistent with the overall thrust output of the engine itself.

A still further feature of this invention is that the engine is configured such that it may be quickly replaced with a spare engine is minimum time. This quick change capability is achieved by placing many of the engine accessories exterior to the nacelle and by mounting the engine to the aircraft pylon such that it may be removed from the aircraft by disconnecting the forward and rear mounts and an engine bleed duct. The mid portion of the nacelle is hinged such that it may be opened to permit that portion of the nacelle to remain with the aircraft when the engine is removed.

BRIEF DESCRIPTION OF THE DRAWINGS

The invention may be better understood upon reading the following description of the preferred embodiment in conjunction with the accompanying drawings in which:

FIG. 21 is a cut away top view of the engine of FIG. 1 illustrating the details of the mounting system.

DESCRIPTION OF THE PREFERRED EMBODIMENT

Figure 1:
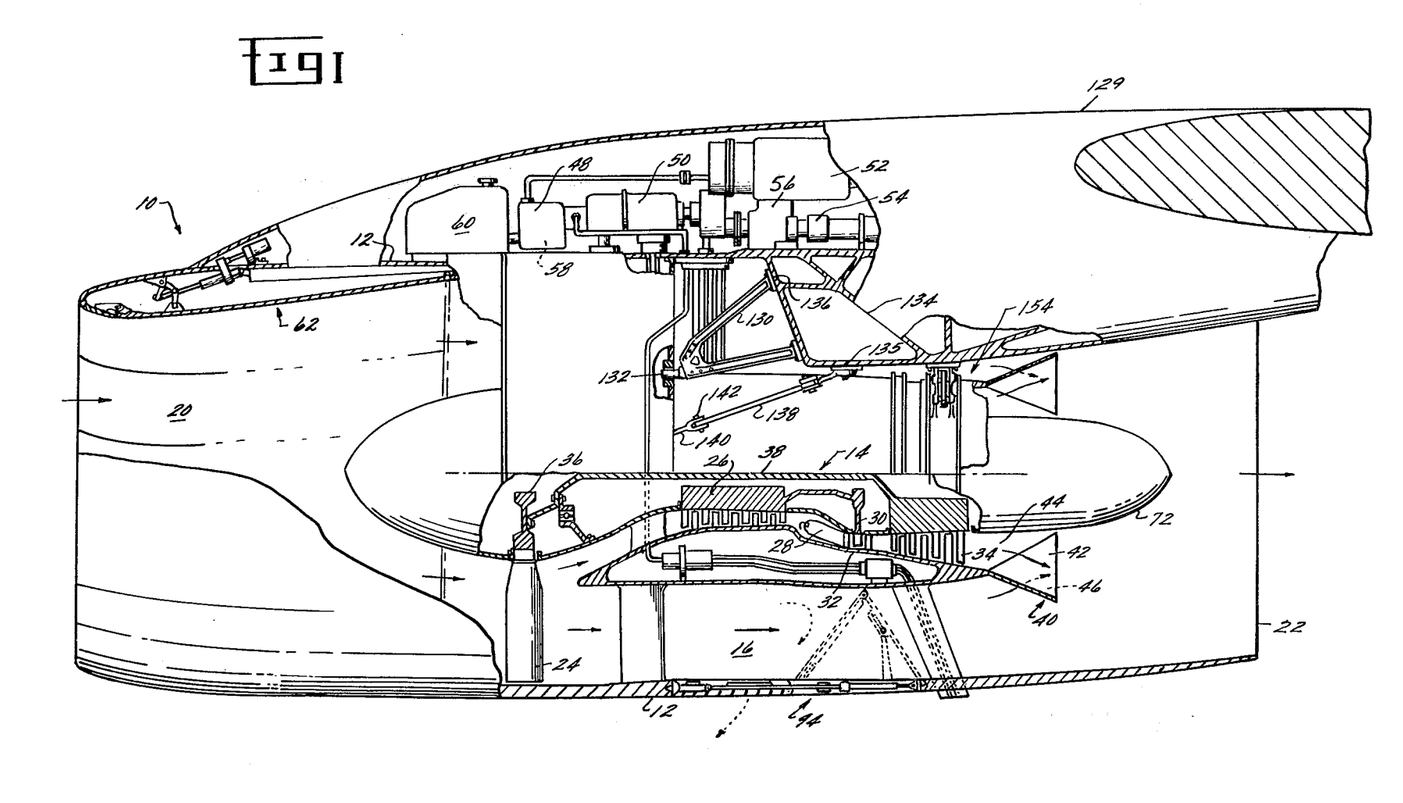
FIG. 1 is a cross-sectional view of the long duct mixed flow engine of this invention.
Figure 2:
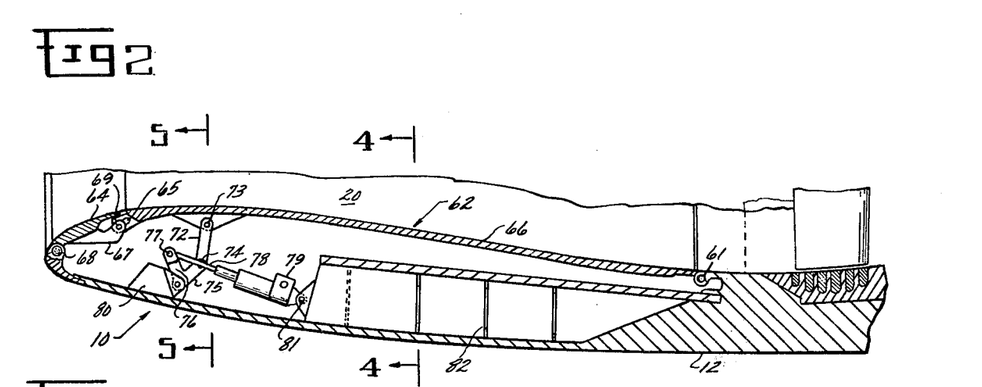
FIG. 2 is an enlarged fragmented view of a portion of the inlet of the engine of FIG. 1 in one mode of operation.
Figure 3:
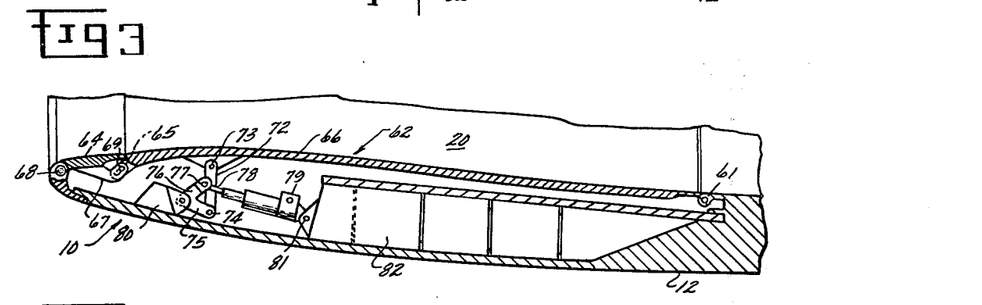
FIG. 3 is an enlarged fragmented view of a portion of the inlet of FIG. 2 in a different mode of operation.

Referring to FIGS. 1 through 3, there is shown a mixed flow gas turbine engine 10 having an outer casing or nacelle 12 spaced apart from an inner core engine shown generally at 14 so as to define an annular bypass duct 16 therebetween. The outer nacelle 12 extends upstream of the core engine 14 to define an inlet 20 to the engine 10 and downstream of the core engine 14 to define a fixed area exhaust nozzle 22 for the engine 10. Disposed in the engine inlet 20 is a fan 24 for pressurizing the total inlet airflow.

In operation, the fan 24 pressurizes the incoming air stream which is thereafter divided between the core engine 14 and the bypass duct 16. The airflow to the core engine 14 is further compressed by a core engine compressor 26 to provide a highly pressurized air stream for supporting combustion of fuel in a combustor 28. The hot gas stream generated by the combustor 28 is used to drive a high pressure turbine 30 which is connected to the rotor of the compressor 26. The hot gas stream discharged from the high pressure turbine 30 passes through an outwardly curved annular duct 32 to a low pressure turbine 34, which is connected to and drives the rotor 36 of the fan 24 through an upstream extending driveshaft 38. Disposed downstream and in flow communication with the low pressure turbine 34 and bypass duct 16 is a convoluted lobed mixer 40 circumscribing an exhaust plug 72 and having a plurality of circumferentially spaced alternating hot chutes 42 in flow communication with the low pressure turbine discharge nozzle 44 and cold chutes 46 in flow communication with the bypass duct 16. The combined flows are thereafter discharged through the fixed area nozzle 22 formed integral with the outer nacelle 12. The mixer 40 is generally of the type described in U.S. Pat. No. 3,508,403, which is designed to reduce aerodynamic pressure losses as the fan and hot gas streams commingle.

In order to provide for ease in service and accessibility of engine accessories, provisions have been made for mounting the engine accessories exterior to the outer nacelle 12. Accordingly, most of the engine accessory components including the fuel pump 48, generator 50, starter 52, hydraulic pump 54, heat exchanger 56, ignition unit 58, and storage tank 60 are mounted exterior to the outer nacelle 12.

Figure 4:
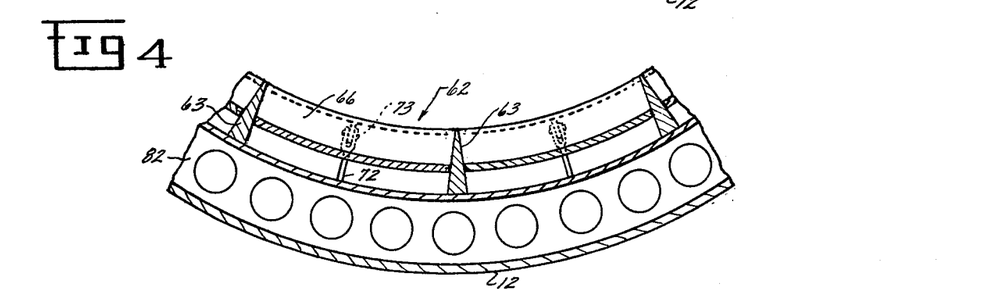
FIG. 4 is a cross-sectional view taken along the line 4—4 of FIG. 2.
Figure 5:
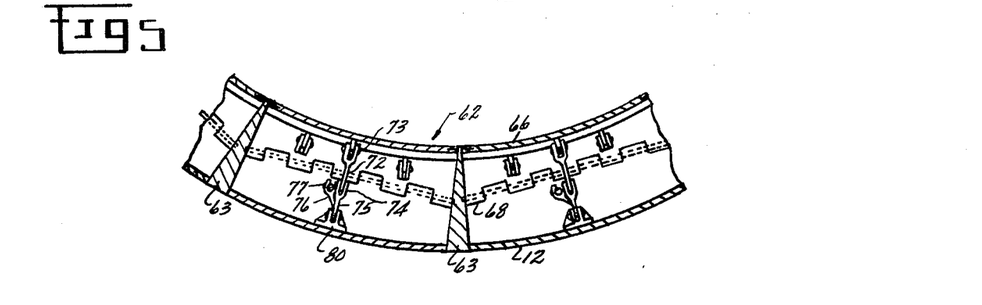
FIG. 5 is a cross-sectional view taken along the line 5—5 of FIG. 2

In order to reduce fan noise during takeoff and climbout, the inlet 20 upstream of the fan 24 is provided with a variable geometry mechanism shown generally at 62 for changing the crosssectional flow area of the throat of the inlet 20. The variable geometry mechanism 62 comprises a plurality of forward panels 64 separated by a plurality of circumferentially spaced wedge members 63, as best seen in FIG. 4, and pivotally mounted to the extreme upstream end of the nacelle 12 at hinge points 68. The variable geometry mechanism 62 further comprises a plurality of aft panels 66 also separated by wedge members 63 and pivotally mounted at their downstream end to the interior face of the nacelle 12 at hinge points 61. Each forward panel 64 includes a downstream extending arm 67 having a pin 69 secured thereto. The pin 69 slidingly and rotatably engages a track 65 formed integral with the upstream end of a respective radially aligned aft panel 66. In order to actuate the variable position inlet a plurality of actuating links 72 are provided, each having one end pivotally mounted to a corresponding one of a plurality of brackets 73 formed integral with respective aft panels 66. The opposite ends of the links 72 are pivotally mounted at a plurality of hinge points 74 to arms 75 of bell crank levers 76. The other arms 77 of bell crank levers 76 are pivotally mounted to the actuating arms 78 of a plurality of linear actuators 79 mounted to a plurality of brackets 81 attached to supporting structure 82 formed integral with the nacelle 12. The bell crank levers 76 are pivotally mounted at the junction of arms 77 and 75 to a respective bracket 80 formed integral with the nacelle 12 upstream of the brackets 81. This arrangement permits the hinged panels 64 and 66 to be moved by the actuators 79, bell crank levers 76 and links 72 to all positions between an increased inlet area position as illustrated in FIG. 3 to a decreased inlet area position as illustrated in FIG. 2. In their decreased inlet area position the hinged panels 64 and 66 cooperate to reduce the cross-sectional flow area of the inlet 20 in order to accelerate the airflow therethrough and thereby reduce forward radiation of engine noise during aircraft takeoff and climbout. During aircraft cruise and landing, the hinged panels 64 and 66 may be maintained in the increased inlet area position. The hinged panels 64 and 66 may also be constructed of acoustically absorbent material to further reduced inlet noise.

Figure 6:
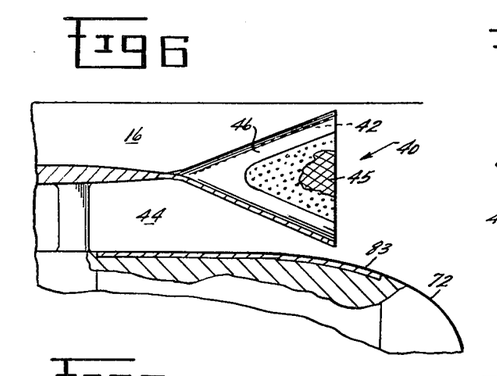
FIG. 6 is a cross-sectional view of an alternate embodiment for the mixer of this invention.

Engine noise is further suppressed by constructing the entire nacelle 12 of a thin wall honeycombed structure which is acoustically absorbent. Engine noise is even further reduced by providing an acoustically absorbent lining 83 on the exhaust plug 72 as best seen in FIG. 6.

Figure 7:
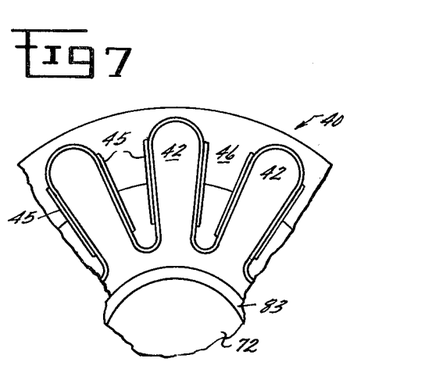
FIG. 7 is an end view of the mixer of FIG. 6.
Figure 8:
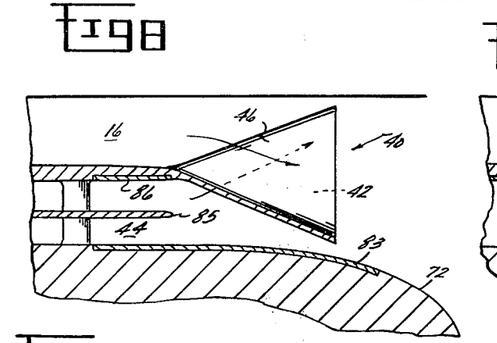
FIG. 8 is a cross-sectional view of an alternate embodiment for the mixer of this invention.
Figure 9:
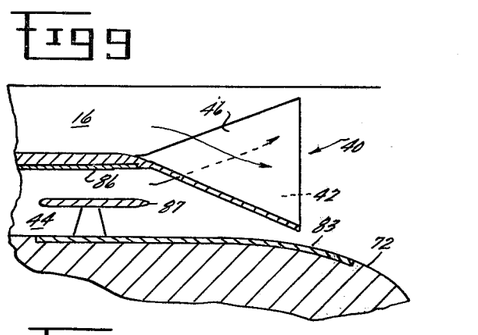
FIG. 9 is a cross-sectional view of an alternate embodiment for the mixer of this invention.
Figure 10:
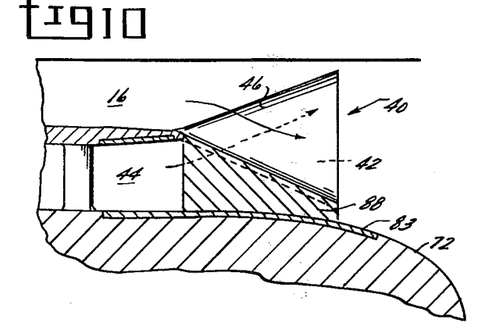
FIG. 10 is a cross-sectional view of an alternate embodiment for the mixer of this invention.
Figure 11:
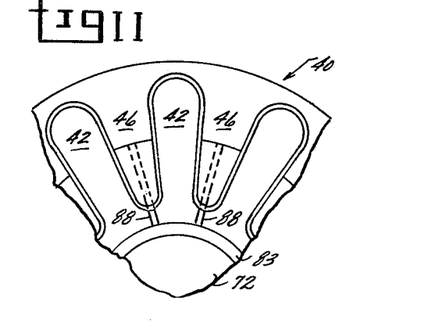
FIG. 11 is an end view of the mixer of FIG. 10.

Further aiding in the reduction of engine noise is the mixer design. Referring to FIGS. 6 through 11 therein are shown alternative embodiments for acoustically treating the mixer 40 in order to reduce engine noise. In the embodiment of FIGS. 6 and 7, the mixer cold chutes 46 are lined with a honeycombed acoustically absorbent material 45. Similarly, the mixer hot chutes 42 may also be provided with an acoustically absorbent liner. In the embodiment of FIG. 8, an acoustically treated annular circumferential spliter 85 is placed within the hot chute 42 upstream of the mixer exit plane and, in addition, the interior walls of the hot chutes 42 are provided with an acoustically absorbent liner 86. In the embodiment of FIG. 9, the circumferential splitter of FIG. 8 is replaced with an acoustically treated spool piece 87 which circumscribes the input to the mixer hot chutes 42. In the embodiment of FIGS. 10 and 11, a plurality of radial splitters 88 extending from the exhaust plug 72 through the inlet to the cold chutes 46 are provided. The structure described in this paragraph and illustrated in FIGS. 6 through 11 is not part of the present invention but is described and claimed in the co-pending application of Donald Farley Sargisson et al., Ser. No. 646,325, filed Jan. 2, 1976, and assigned to the assignee of the present invention.

Figures 12, 13:
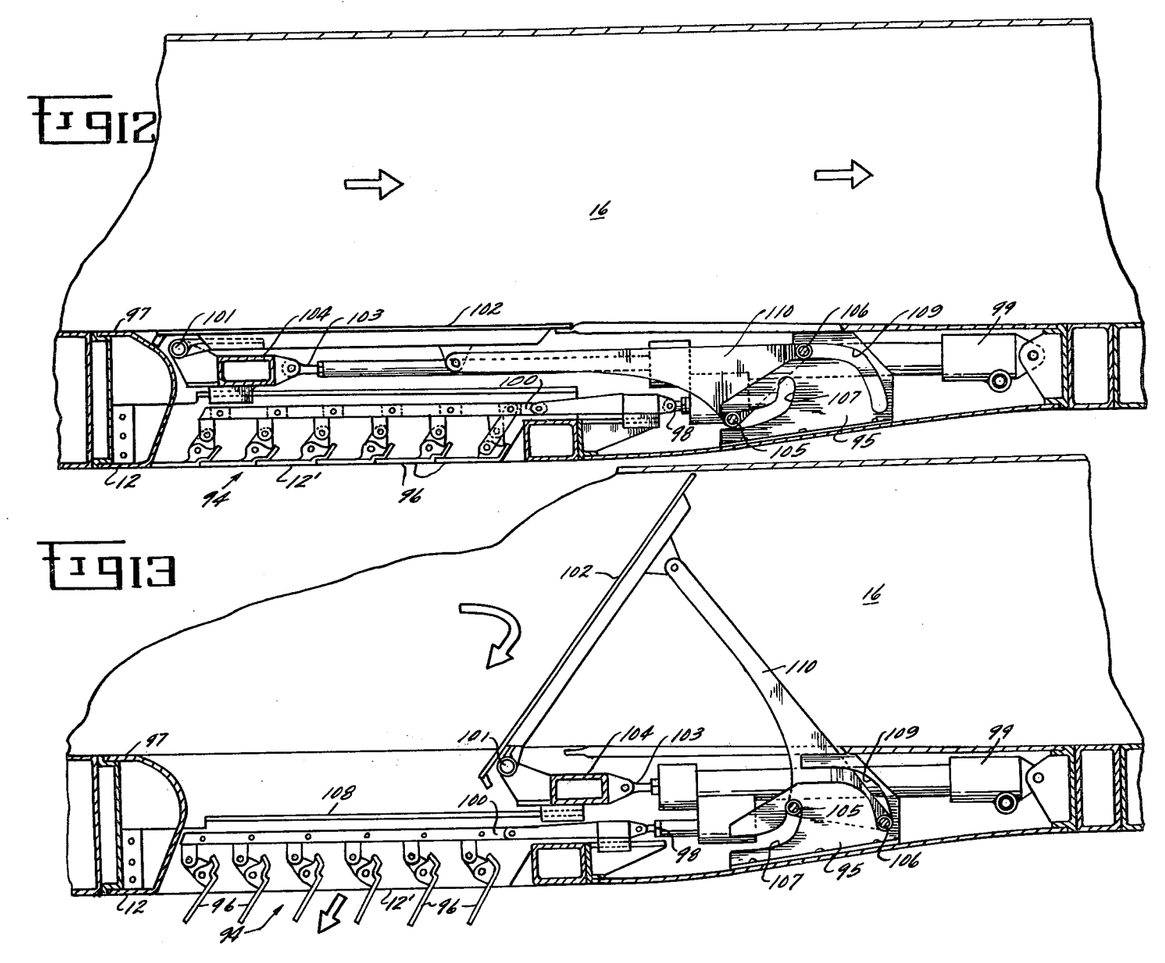
FIG. 12 is an enlarged cross-sectional view of the thrust reverser of this invention in an open position.
FIG. 13 is a cross-sectional view of the thrust reverser of FIG. 12 in a closed position.
Figure 12:
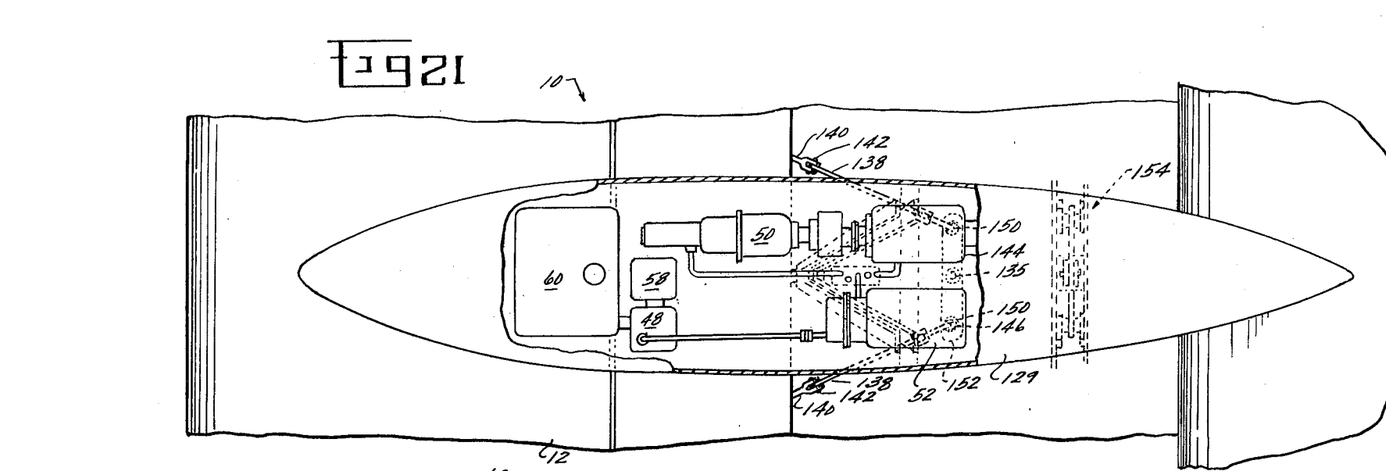

In accordance with another feature of the engine of this invention, a plurality of bypass stream thrust reversers, shown generally at 94, are circumferentially spaced around the engine provided immediately aft of the engine fan frame. Each thrust reverser 94, as best seen in FIG. 12, includes a plurality of cascaded turning chutes 96 operated by a suitable linear actuator 98 through an arm 100. A second linear actuator 99 is provided to operate the blocker door 102. The actuator 99 includes a control arm 103 which operates the door 102 through a bracket 104 pivotally engaging the upstream end of blocker door 102 at a hinge point 101. The upstream end of the blocker door 102 and bracket 104 slidingly engages a track 108 mounted to the interior of nacelle 12. The opposite end of the blocker door 102 is pivotally mounted to the upstream end of an arm 110. The opposite end of the arm 110 includes a pair of rollers 105 and 106 which slidingly and rotatably engage respective cam tracks 107 and 109 formed integral with bracket 95 which is secured to the nacelle 12. Upstream movement of the actuator arm 100 causes opening of the cascaded turning chutes 96. Similarly, upstream translation of the control arm 103 causes deployment of the blocker door 102 as illustrated in FIG. 13 so as to redirect the bypass duct flow through the curved chutes 96 and thereby develop reverse thrust for braking after aircraft landing. Downstream retraction of the actuator arms 100 and 103, as best seen in FIG. 1, causes the blocker door 102 and cascaded chutes 96 to close, thereby permitting the bypass stream to flow uninhibited to the mixer 40. The unique design of the thrust reverser 94 permits the engine sidewalls, shown generally at 111 immediately aft of the fan frame 97, to be maintained axially linear and parallel or curved to produce an essentially cylindrical structure rather than diverging radially inward or axially curved as is generally required to meet the aerodynamic requirements of prior art thrust reversal systems. Such essential cylindrical parallel wall structures are significantly less costly to manufacture than the prior art non-parallel or axially curved structures. Adequate thrust reversal is achieved by the bypass flow reverser 94 without the use of core flow spoilers or reversers since an additional reverse thrust bonus will be produced by the engine upon reversal of the bypass flow. When the bypass flow is reversed, the core gas stream becomes over-expanded at the mixer exhaust and thereby loses a very substantial portion of its propulsive effectiveness as it is discharged through the exhause nozzle 22.

Figure 14:
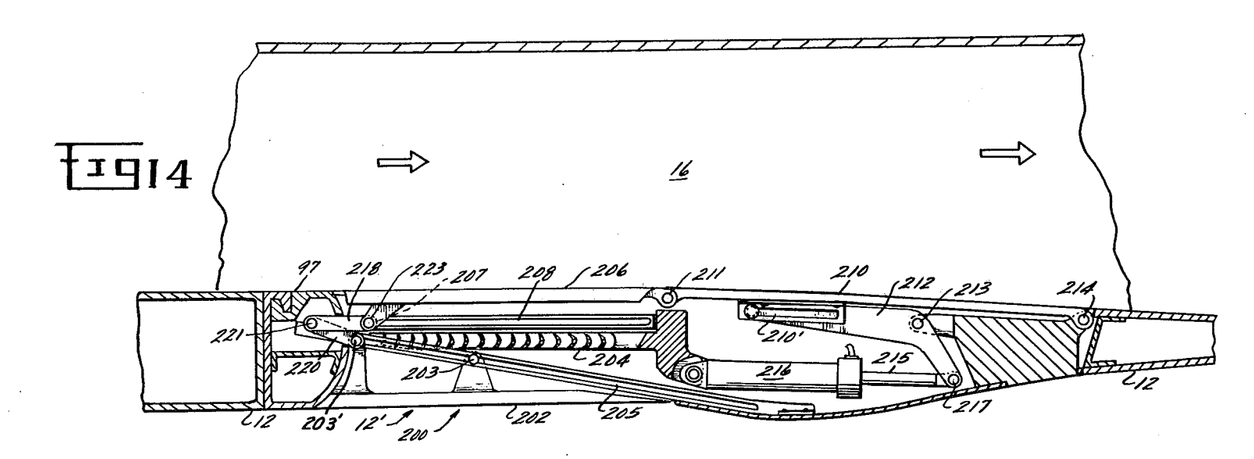
FIG. 14 is a cross-sectional view of an alternate embodiment for the thrust reverser of this invention in an open position.
Figure 15:
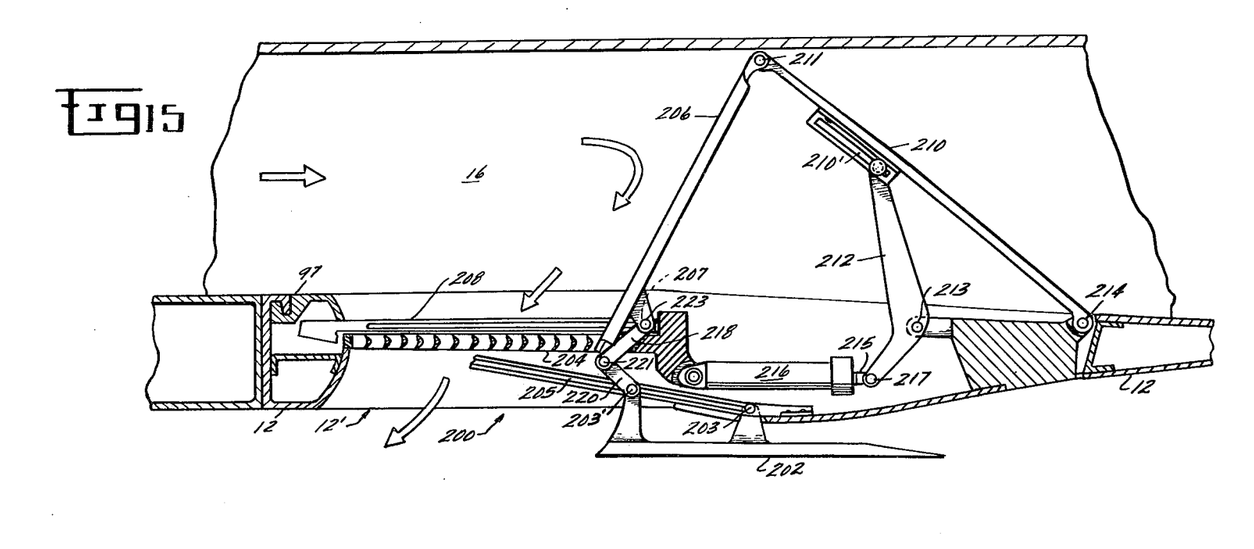
FIG. 15 is a cross-sectional view of the thrust reverser of FIG. 14 in a closed position.
Figure 16:
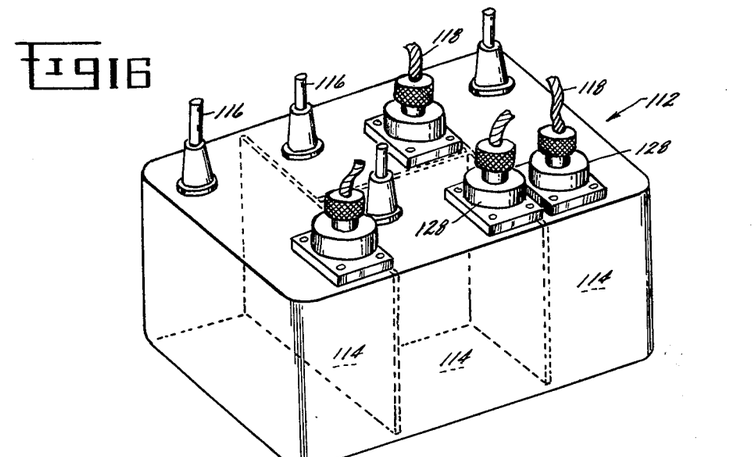
FIG. 16 is a perspective view of an ecological drain tank for the engine of this invention.

Referring to FIGS. 14 and 15, there is shown an alternate embodiment for the bypass flow reverser of this invention which also permits a cylindrical structure to be utilized aft of the fan frame 97. Each of the circumferentially spaced reversers shown generally at 200 includes an outer door 202 disposed to cover a plurality of turning vanes 204 in the outer nacelle 12. The outer door 202 includes a pair of rollers 203 and 203' which slidingly engage a beam track 205 which diagonally spans the turning vanes 204. The reverser further comprises an annular blocker door 206 each having a roller 207 at one end which slidingly engages a second track 208 spaced radially outward from and spanning the vanes 204. The opposite end of the blocker door 206 is pivotally hinged to a support door 210 at a hinge point 211. The opposite end of the support door 210 is pivotally hinged to the engine outer nacelle 12 at a downstream point 214. A bell crank lever 212 has one end mounted in sliding engagement with the support door 210 by means of a track 210', its opposite end hinged below its midspan to the outer nacelle 12 at a hinge point 213 and at its outer extremity pivotally mounted to the actuating arm 215 of a linear actuator 216 at a hinge point 217. In order to provide an actuation force to the outer door 202, a pair of links 218 and 220 are provided. Link 218 is pivotally mounted to the upstream end of the blocker door 206 at a hinge point 223 and also pivotally mounted to one end of the link 220 at a hinge point 221. The other end of link 220 pivotally engages the roller 203' at the upstream end of the outer door 202. In this manner, translation of the blocker door 206 along the track 208 by the actuator 216 will cause simultaneous translation of the outer door 202 along the track 205. Upstream translation of the arm 215 of the actuator 216 causes the blocker door 206 to move to a deployed position, a shown in FIG. 15, wherein the bypass flow is obtruded. Simultaneously the outer door is moved in the downstream direction to uncover the vanes 204 whereby the bypass flow is directed between the vanes 204 so as to reverse the direction of discharge of the bypass flow and thereby develop reverse thrust. Downstream translation of the actuator arm 215 causes the blocker door 206 and outer door 202 to assume a closed position, as illustrated in FIG. 14, wherein the bypass flow is unobtruded.

Figure 17:
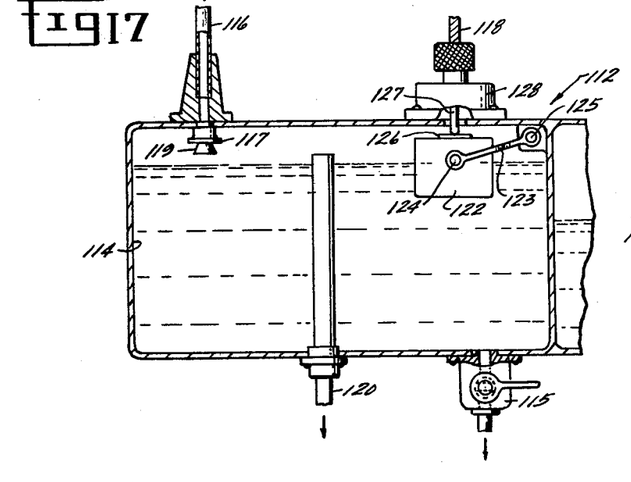
FIG. 17 is a cross-sectional view of one compartment of the ecological drain tank of FIG. 16.
Figure 18:
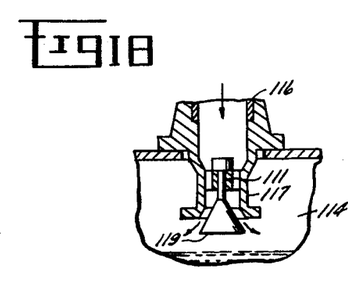
FIG. 18 is an enlarged view of an anti-gravity check valve used with the drain tank of FIG. 16 in an open position.
Figure 19:
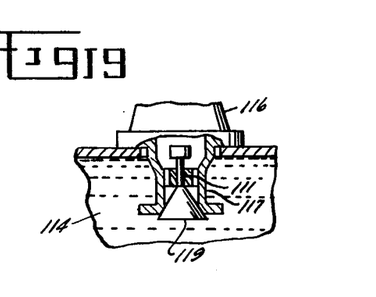
FIG. 19 is an enlarged view of the anti-gravity check valve of FIG. 18 in a closed position.

In order to reduce runway spillage of engine fluids, and to assist in the location of fluid system failures, the engine of this invention is also provided with a compartmented ecological drain tank system. The drain tank 112, as best seen in FIGS. 16 through 20, includes a plurality of compartments 114, each having a fill line 116 in flow communication with a different engine fluid system drain line. Each fill line 116 is equipped with an antigravity check valve 117, as best seen in FIGS. 18 and 19 in order to prevent fluid from back flowing from the compartment 114 into the engine fluid drain system in the event the engine is subjected to zero or negative gravity. The check valve 117 is slidingly mounted on the valve seat 111 and remains in the open position as illustrated in FIG. 18 unless gravitational or centrifugal pull on the poppet valve 119 causes it to move to the closed position, as illustrated in FIG. 19. Each tank compartment 114 includes a manually actuated drain port 115 which may be used to drain the compartment 114 when required. Each tank compartment is also equipped with a separate overflow line 120, as best seen in FIG. 17, to port excess drainage overflow overboard at a point exterior to the engine nacelle 12. Because excess drainage from each fluid system is ported overboard by a separate line, the source of an excess fluid leakage may easily be identified by examining the drain ports 120 to determine from which tank compartment the excess drainage originates.

Figure 20:
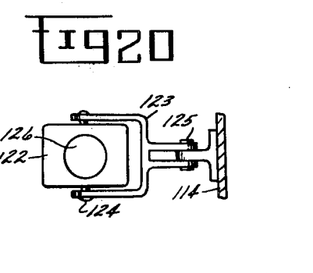
FIG. 20 is a top view of the float operated switch utilized in the drain tank of FIG. 16.

In order to provide a remote indication of the source of excess fluid leakage, each compartment 114 may be provided with a float valve 122, as best seen in FIGS. 17 and 20. The valve 122 is pivotally hinged to a yoke 123 by means of a pin 124 therethrough. The opposite end of the yoke 123 is pivotally hinged to a wall of the compartment 114 at a suitable hinge point 125. The float valve 122 includes a striker plate 126 and is positioned in the compartment 114 such that when the fluid draining into the compartment 114 reaches a predetermined level corresponding to an excess drainage condition into the compartment 114, the striker plate 126 will engage an actuating arm 127 to close the contacts of a suitable electrical switch 128, well known in the art. The switch 128 may be utilized to provide a remote indication of the excess drainage condition, through electrical conduit 118, such as by energizing a warning light (not shown) in an aircraft. The switch 128 may be provided with a suitable time delay circuit to prevent unnecessary activation of the warning light during short time duration aircraft maneuvers.

Figure 22:
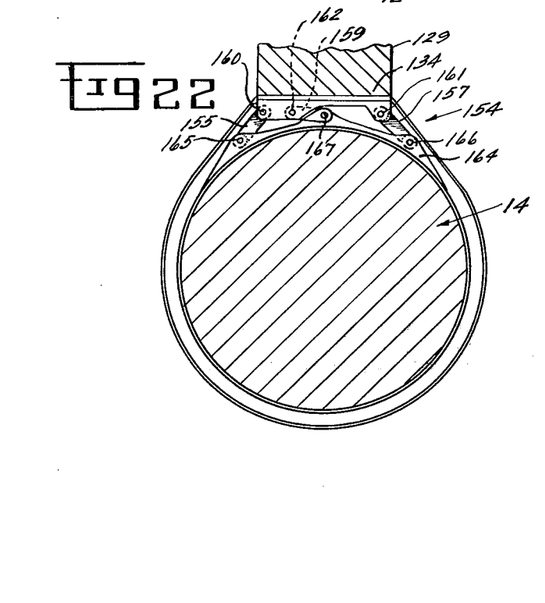
FIG. 22 is an enlarged view of a portion of the engine of FIG. 1 illustrating details of the mounting system.

Also included in the overall design of the engine of this invention is a unique system for mounting the nacelle to the aircraft pylon structure 129 which includes a forward trapezoidal bracket 130 secured at its upstream end to the engine frame by means of an axial bearing 132 and secured at its downstream end to the aircraft pylon beam structure 134 by means of four tension bolts 136 or other suitable attachment means. In this manner, the trapezoidal bracket 130 is able to absorb vertical and side engine loads but is prohibited from absorbing thrust and torque loads. The mounting system further comprises a pair of thrust links 138 circumferentially and symmetrically spaced around the engine. Each thrust link 138 is secured at its upstream end to the engine frame by means of a fork 140 having a uniball 142 disposed therein such that the thrust links 138 will absorb thrust loads only and will be prevented from absorbing vertical side or torque loads and secured at its downstream end to a cross link 144, by a uniball 146, as best seen in FIG. 21. In order to automatically equalize the engine load between the thrust links 138, the cross link 144 is disposed intermediate the thrust links 138, and is pivotally mounted at its center to the pylon beam structure 134 at a hinge point 135 such that engine thrust loads are automatically equalized between the two thrust links 138. The mounting system further comprises a rear mount, shown generally at 154. The rear mount 154, as best seen in FIG. 22, includes outside links 155 and 157 and middle link 159. Each of the links 155, 157 and 159 has one end connected to the lower portion of the pylon beam structure 134 by respective uniballs 160, 161 and 162 and are joined to lobed extensions of the engine frame 164 at their lower ends by means of respective uniballs 165, 166 and 167. In this manner, the rear mount 154 is prevented from assuming thrust loads and assumes vertical, side and torque loads. The novel mounting system for the engine of this invention thus permits all engine loads to be nonredundantly balanced between the trapezoidal bracket 130, the two thrust links 138, and the rear mount system 154.

Figure 23:
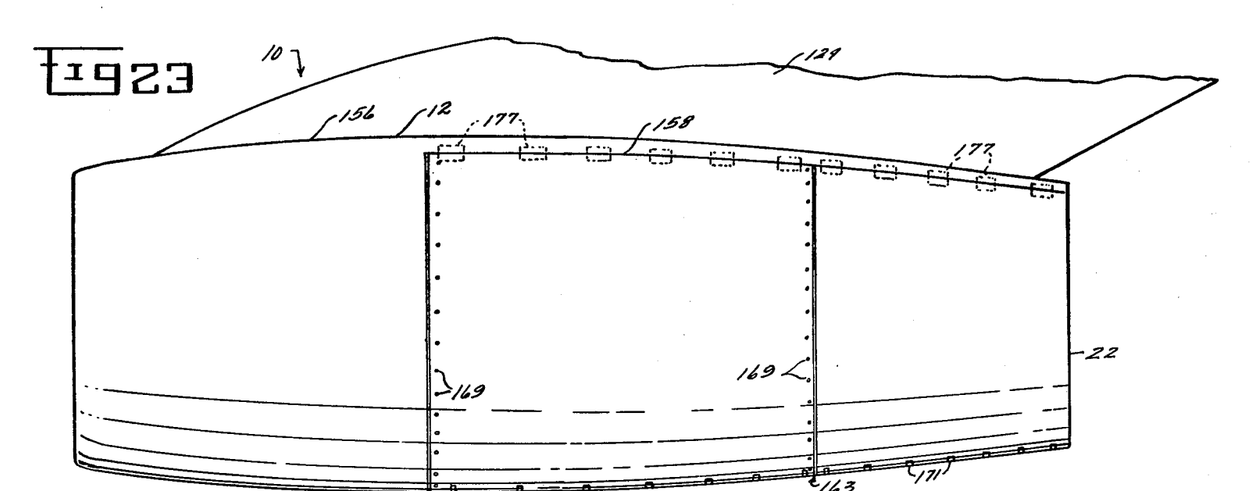
FIG. 23 is a side view of the engine of FIG. 1.

In accordance with another feature of this invention, as best seen in FIG. 23, the nacelle 12 is separable into three major portions, an inlet portion 156, a mid portion 158 and an aft portion forming the exhaust nozzle 22.

Figure 25:
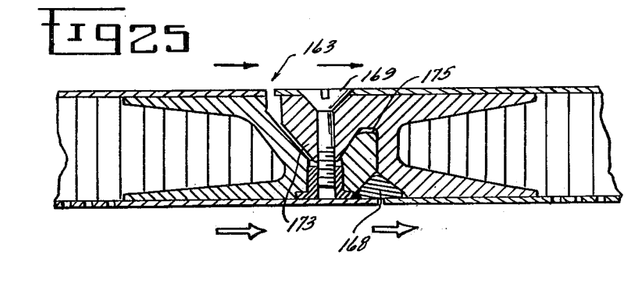
FIG. 25 is an enlarged view of a portion of the nacelle of the engine of FIG. 1 illustrating the details of the interlocking joint structure.

The inlet 156, mid 158 and aft 22 portions of the nacelle 12 are mechanically locked to each other by a pair of circumferentially extending joints 163 which are designed to react axial loads in either the forward or aft thrust direction and also permit the mid and aft portions of the engine nacelle 12 to be opened for ease in inspection and service of the engine. Each joint 163, as best seen in FIG. 25, includes a pair of interlocking annular lips 173 and 175 which are reinforced by a plurality of bolts 169 which are spaced around the outer circumference of the nacelle 12 at the joint 163. A suitable seal 168 is provided around the inner circumference of the nacelle 12 at the joints 163 in order to prevent aerodynamic leakage through the joints 163. The nacelle mid and aft portions 158 and 22 respectively are hinged along their respective upper ends along two parallel axially extending rows of hinge points 170 and 177 such that the mid and aft nacelle portions 158 and 22 respectively may be opended for ease in service and inspection of the core engine and other components located in this region of the engine. The two respective halves of the mid and aft portions of the nacelle 12 are locked together by a plurality of axially extending tension latches 171.

Figure 24:
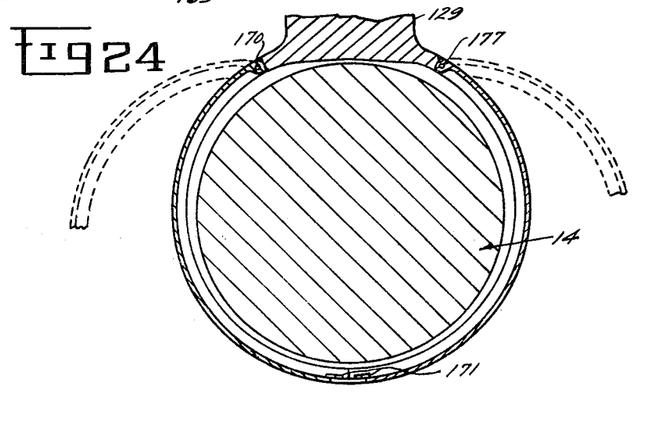
FIG. 24 is a front view of a portion of the engine of FIG. 1 illustrating the nacelle construction.

In accordance with another feature of this invention, the location of the engine accessories, the means by which the engine is mounted to the aircraft pylon and the three part construction of the outer nacelle permit the engine of this invention to be replaced in minimum time. Thus the engine may be removed from the aircraft pylon by disconnecting the forward trapezoidal bracket 130, the thrust links 138, and rear mount 154 from the pylon beam structure 134 and by disconnecting a bleed valve (not shown). Thereafter the bolts 169 may be removed, and the tension latches 171 released to permit the mid and aft portions 158 and 22 respectively of the nacelle 12 to be swung open, as shown in phantom in FIG. 24 to release the engine and remaining portion of the nacelle 12.

Having described preferred embodiments of the present invention, though not exhaustive of all equivalents, it will be appreciated by those skilled in the art that many modifications, substitutions and changes may be made thereto without departing from the fundamental theme of the invention. Therefore, what is desired to be secured by Letters Patent is as follows.

What is claimed is:

1. A gas turbine engine comprising:
   a core engine including a compressor, combustor and high pressure turbine in serial flow relation;
   a low pressure turbine disposed to receive the hot gases exhausted from the core engine;
   an outer nacelle circumscribing and spaced apart from the core engine to define a bypass duct therebetween and extending upstream of the core engine to define an inlet to the gas turbine engine and downstream of the low pressure turbine to form the exhaust nozzle for the gas turbine engine;
   a fan disposed in the inlet in driven engagement with the low pressure turbine for providing compressed airflow to the bypass duct and core engine;
   means for suppressing engine noise;
   means for mounting the engine to the pylon beam structure of an aircraft such that engine loads are balanced in a nonredundant manner;
   said pylon beam mounting means comprising a forward trapezoidal bracket secured intermediate the pylon beam structure and the engine frame for absorbing vertical and said engine loads;

a pair of thrust links circumferentially spaced around the engine for absorbing engine thrust loads, each thrust link being secured at its upstream end to the engine frame by a fork having a uniball disposed therein and secured at the downstream end to the pylon beam structure; and rear mount means secured to the engine frame and the pylon beam structure rearwardly of the thrust links for absorbing vertical, side and torque loads.

2. The gas turbine engine of claim 1, wherein a cross link is pivotally mounted at its center on the pylon beam structure for equalizing engine thrust loads between the thrust links; and the downstream ends of the thrust links are connected to the cross link on opposite sides of the center thereof.

3. The gas turbine engine of claim 2, wherein:

the engine frame includes a plurality of lobed extensions;

the rear mount includes a plurality of links;

uniballs connecting one end of each of the links to the pylon beam structure; and uniballs connecting the other end of each of the links to a corresponding one of the lobed extensions.

* * * * *